Figure 1:
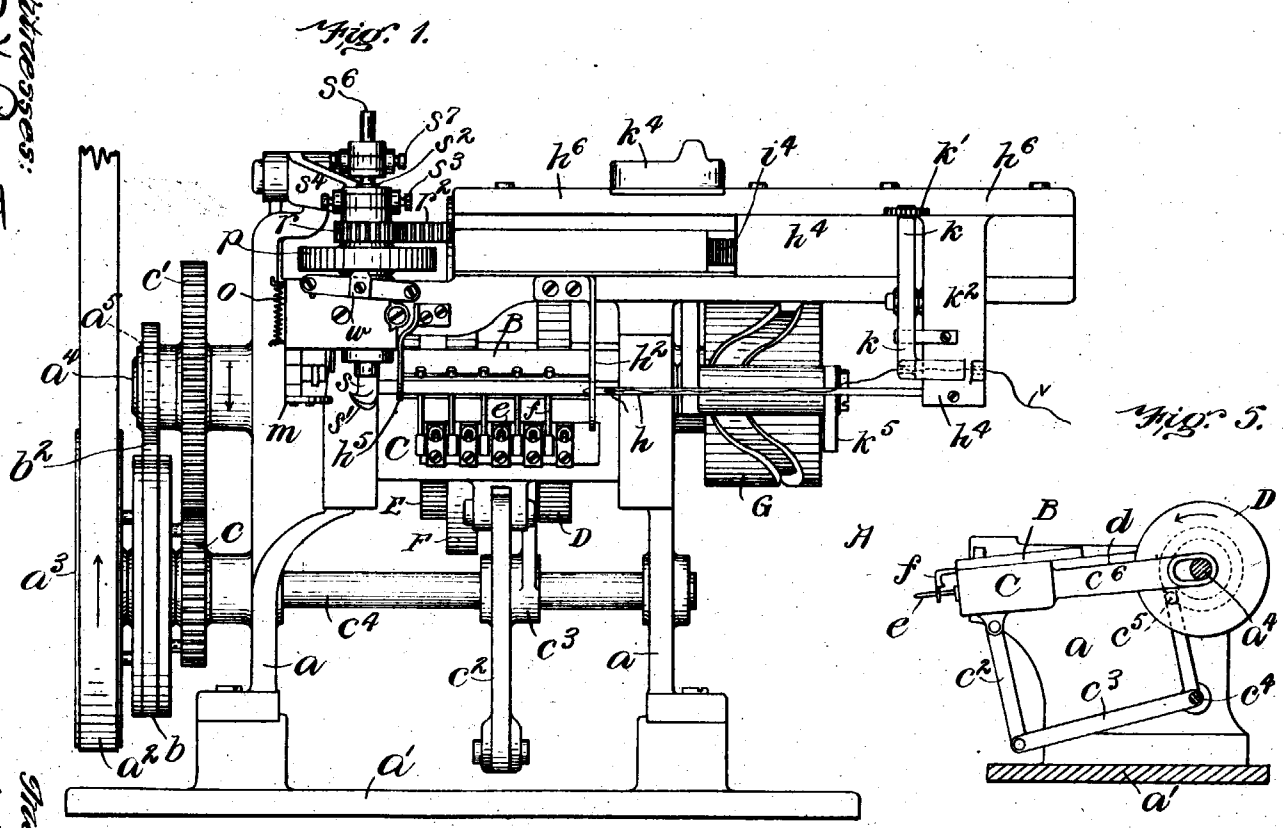

No. 12,638. REISSUED APR. 23, 1907.

W. A. SMITH.

MACHINE FOR AUTOMATICALLY LACING SHOE UPPERS.

APPLICATION FILED MAY 10, 1905.

8 SHEETS—SHEET 1.

Witnesses:
P. H. Pezzetti
E. Batchelder

Inventor:
W. A. Smith
By Wright Brown Quinby & May
Attorneys.

No. 12,638. REISSUED APR. 23, 1907.

W. A. SMITH.

MACHINE FOR AUTOMATICALLY LACING SHOE UPPERS.

APPLICATION FILED MAY 10, 1905.

8 SHEETS—SHEET 2.

Witnesses:

P. W. Pezzetti

E. Batchelder

Inventor:

W. A. Smith

By Wright Brown & Quinby

Attorneys.

No. 12,638. REISSUED APR. 23, 1907.

W. A. SMITH.

MACHINE FOR AUTOMATICALLY LACING SHOE UPPERS.

APPLICATION FILED MAY 10, 1905.

8 SHEETS—SHEET 3.

Witnesses:
P. W. Pezzetti
E. Batchelder

Inventor:
W. A. Smith
By Wright Brown Quinby & May
Attorneys.

No. 12,638. REISSUED APR. 23, 1907.

W. A. SMITH.

MACHINE FOR AUTOMATICALLY LACING SHOE UPPERS.

APPLICATION FILED MAY 10, 1905.

8 SHEETS—SHEET 4.

Witnesses:
P. W. Pezzetti
E. Batchelder

Inventor:
W. A. Smith
By Wright Brown Quinby & May
Attorneys.

No. 12,638. REISSUED APR. 23, 1907.
W. A. SMITH.
MACHINE FOR AUTOMATICALLY LACING SHOE UPPERS.
APPLICATION FILED MAY 10, 1905.
8 SHEETS—SHEET 5.
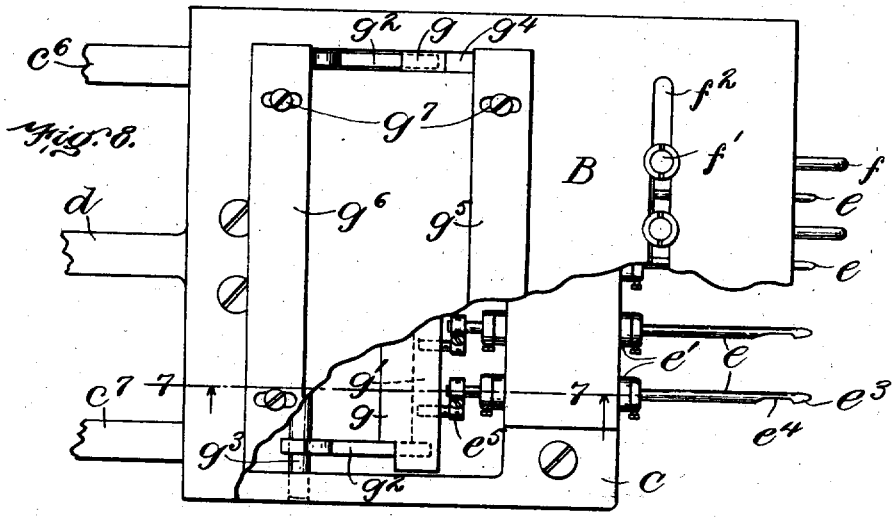
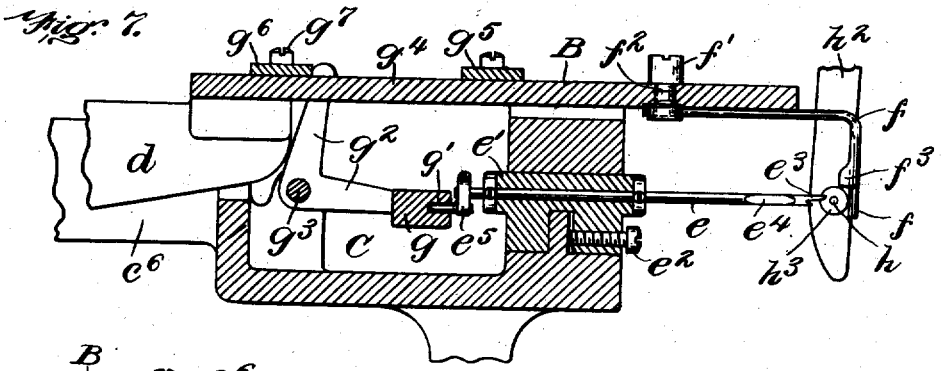
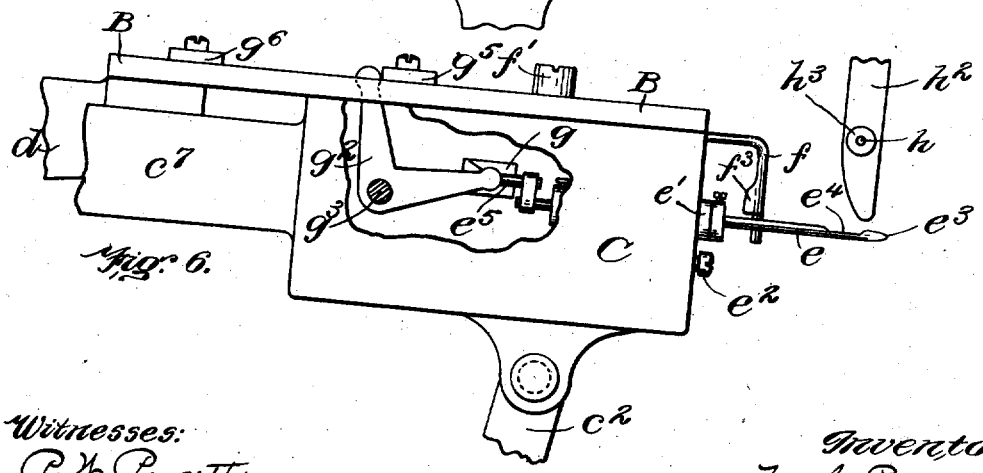
Witnesses:
P. H. Pezzetti
E. Batchelder
Inventor:
W. A. Smith
By Wright Brown Quinby & May
Attorneys.

No. 12,638. REISSUED APR. 23, 1907.
W. A. SMITH.
MACHINE FOR AUTOMATICALLY LACING SHOE UPPERS.
APPLICATION FILED MAY 10, 1905.
8 SHEETS—SHEET 6.
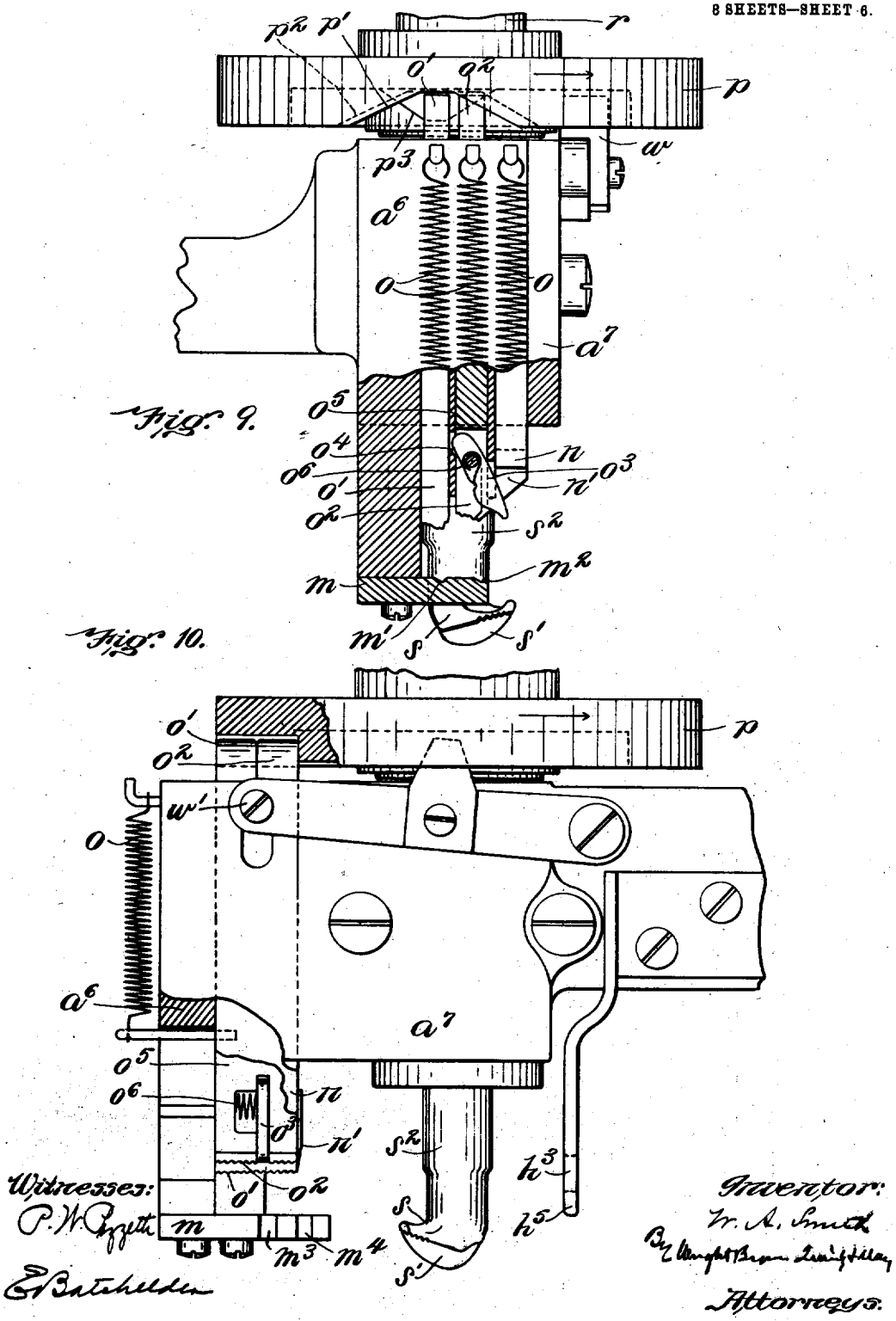

No. 12,638. REISSUED APR. 23, 1907.

W. A. SMITH.

MACHINE FOR AUTOMATICALLY LACING SHOE UPPERS.

APPLICATION FILED MAY 10, 1905.

8 SHEETS—SHEET 7.

Witnesses:
P. W. Pezzetti
E. Batchelder

Inventor:
W. A. Smith
By Wright Brown Quinby & May
Attorneys.

No. 12,638. REISSUED APR. 23, 1907.

W. A. SMITH.

MACHINE FOR AUTOMATICALLY LACING SHOE UPPERS.

APPLICATION FILED MAY 10, 1905.

8 SHEETS—SHEET 8.

Witnesses:

P. H. Pezzetti

E. T. Batchelder

Inventor:

W. A. Smith

By Wright Brown Quinby & May

Attorneys.

UNITED STATES PATENT OFFICE.

WILLARD A. SMITH, OF MELROSE, MASSACHUSETTS, ASSIGNOR, BY MESNE ASSIGNMENTS, TO UNITED SHOE MACHINERY COMPANY, OF PATERSON, NEW JERSEY, A CORPORATION OF NEW JERSEY.

MACHINE FOR AUTOMATICALLY LACING SHOE-UPPERS.

No. 12,638. Specification of Reissued Letters Patent. Reissued April 23, 1907.

Original No. 779,008, dated January 3, 1905. Application for reissue filed May 10, 1905. Serial No. 259,839.

*To all whom it may concern:*

Be it known that I, WILLARD A. SMITH, of Melrose, in the county of Middlesex and State of Massachusetts, have invented certain new and useful Improvements in Machines for Automatically Lacing Shoe-Uppers, of which the following is a specification.

In a patent of the United States granted to me October 6, 1903, No. 740,938, are shown and described new and improved means for porarily lacing or securing together the two eyeleted portions or quarters of shoe-uppers preparatory to "lasting" them.

My invention herewith relates to an improved machine or mechanism for automatically lacing shoe-uppers, the machine being more particularly designed and adapted to perform the lacing operation referred to in said patent. To that end my present invention consists, essentially, of an organized machine having a reciprocating cord-carrying needle, intermittingly-movable looper needles and fingers for simultaneously forming the cord into loops, devices for holding and severing the cord, and means for tying the severed ends of the cord together and releasing the work or temporarily-laced shoe-upper from the machine, all as hereinafter set forth and claimed.

Heretofore, so far as I am aware, the operation of lacing shoe-uppers (preparatory to lasting and bottoming them) has been a comparatively slow process, even when it is performed mechanically, since the cord is introduced through the several series or pairs of eyelets successively, the shoe-upper meanwhile being intermittingly fed ahead to register with the loop or stitch forming mechanism.

By means of my invention the lacing-cord is first introduced between the outer ends of a series of looper-needles and the adjacent rear side of a corresponding series of looper-fingers alternating therewith and having the free or forward end of the cord retained in a holding device. The said fingers are next retracted past the needles, thereby causing the cord to be engaged by the two sets of members and converting it into a connected series of zigzag initial loops or bends. The attendant next places the shoe-upper in position and presses the eyeleted portion thereof onto the corresponding looper-needles, the latter, together with the cord supported therein, then extending in front through the upper. A connected portion of the cord is then fed endwise through said loops or bends in front of the upper, followed by clamping the cord and severing it from the spool or source of supply, the free end of the latter meanwhile being retracted by the main feeder-needle to the original or normal stationary position. The looper needles and fingers are next actuated, thereby stripping the upper from them. At substantially the same instant the knot-tying device is brought into action, the result being to tie the two adjacent end portions of the cord together, immediately after which the now laced upper is released from the machine, followed by forming another series of initial loops, at which instant the machine automatically stops, thus completing the operation. The upper thus operated upon now possesses a number or series of interconnected loops formed in a corresponding series of pairs of its eyelets, the length of the loops thus formed being such as to permit the two parts or quarters of the upper to be flattened out or properly fitted to the last, the central edges of the upper then being substantially parallel or normal, the knot in the cord at the same time serving to keep the adjacent parts of the upper in the proper relation during the subsequent operation of lasting and bottoming.

Figure 2:
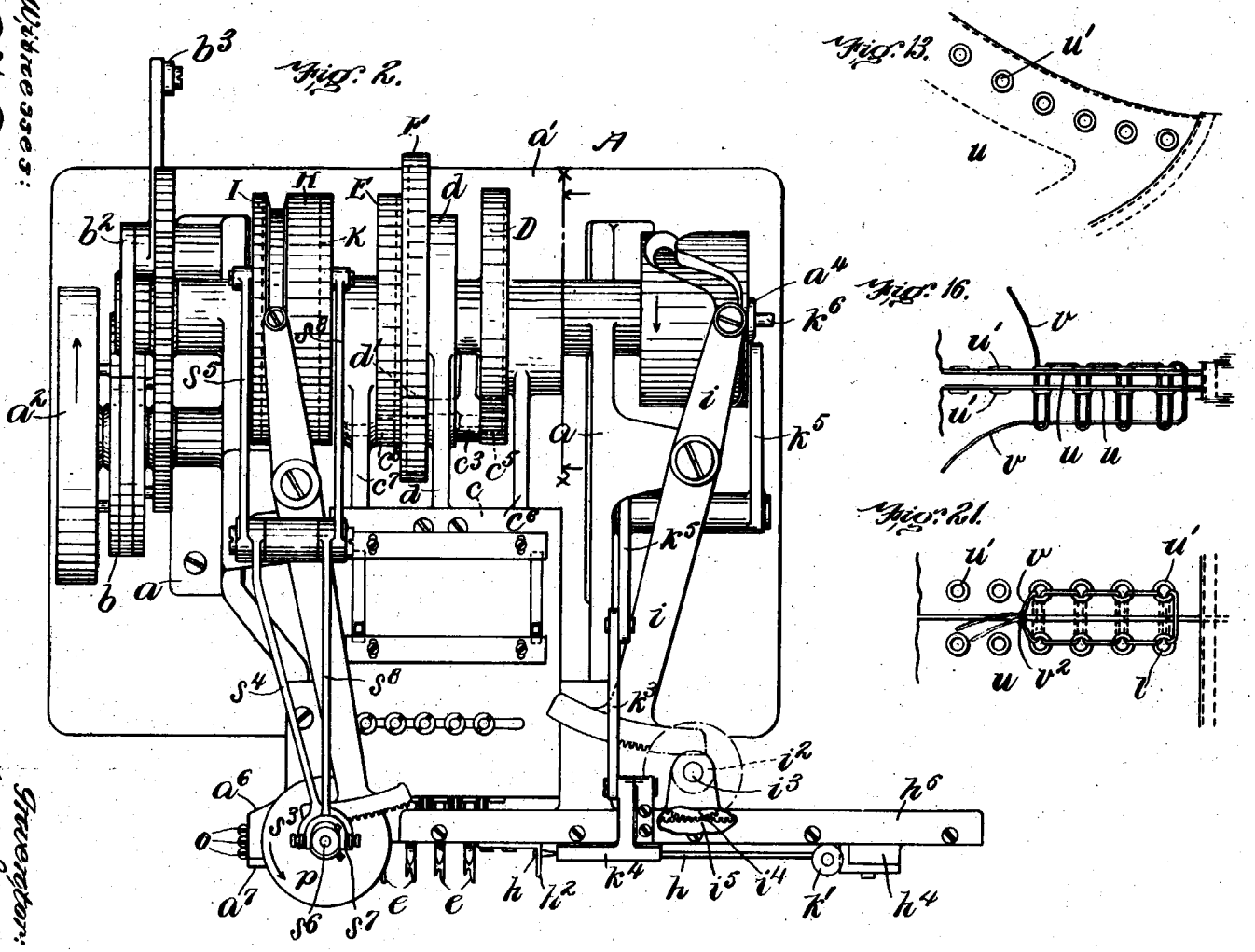
Figure 3:
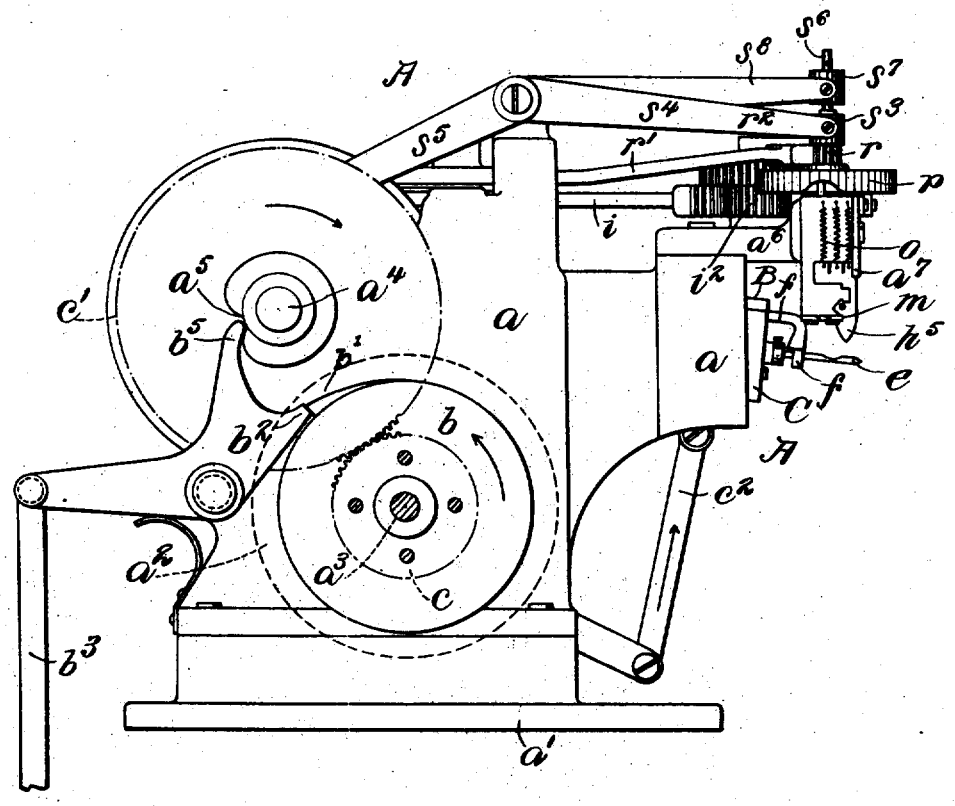
Figure 4:
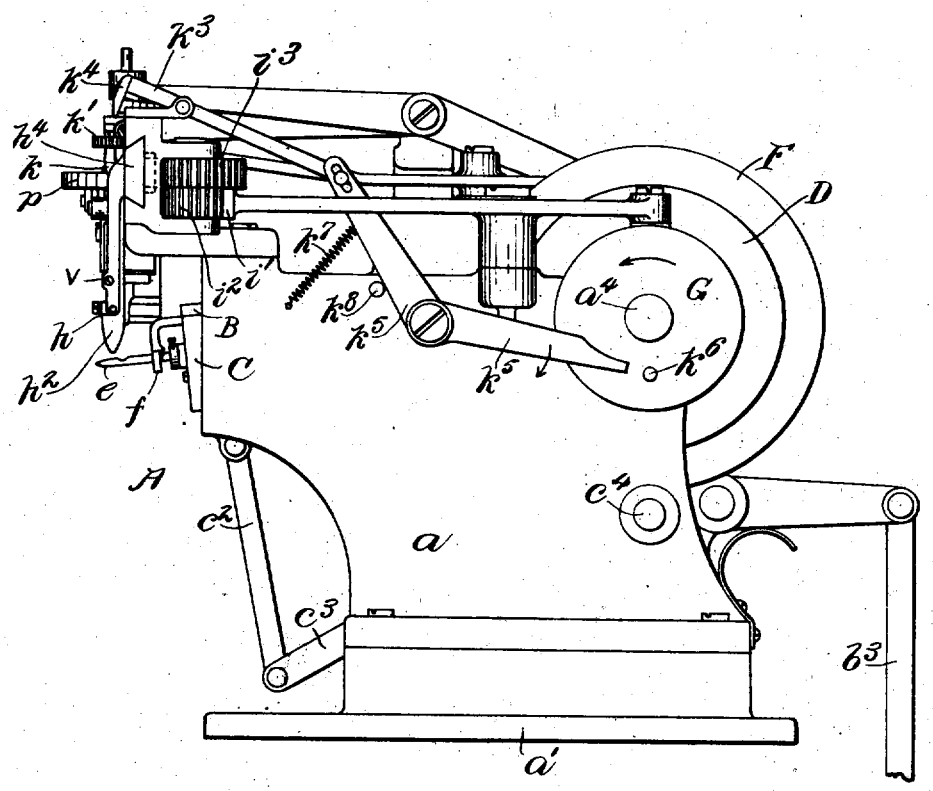
Figure 11:
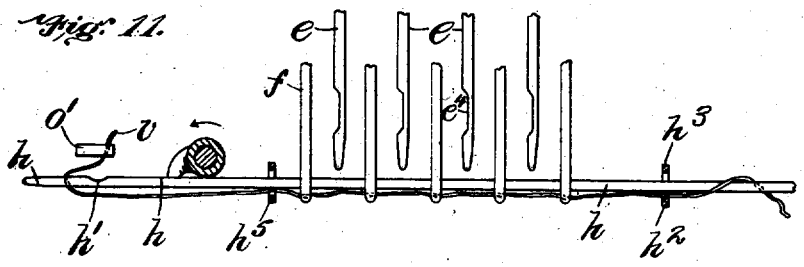
Figure 12:
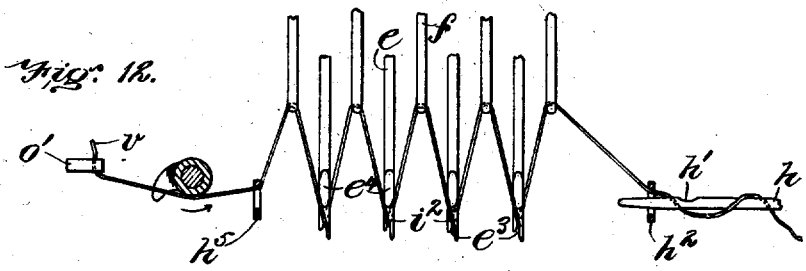
Figure 14:
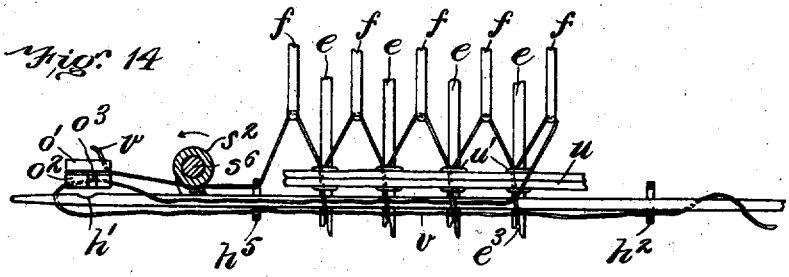
Figure 15:
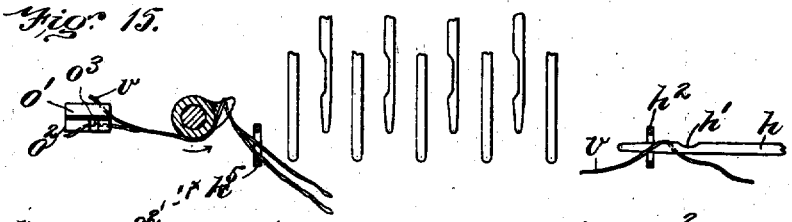
Figure 17:
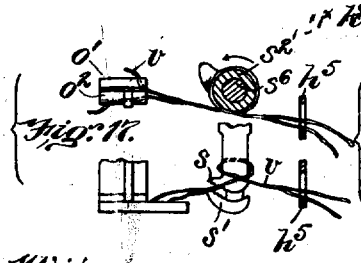
Figure 18:
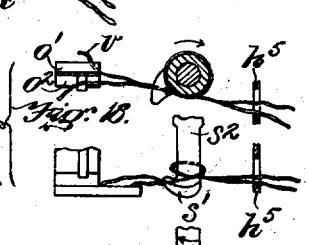
Figure 20:
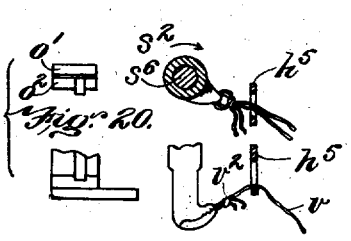
Figure 19:
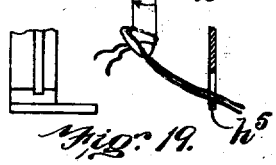
Figure 25:
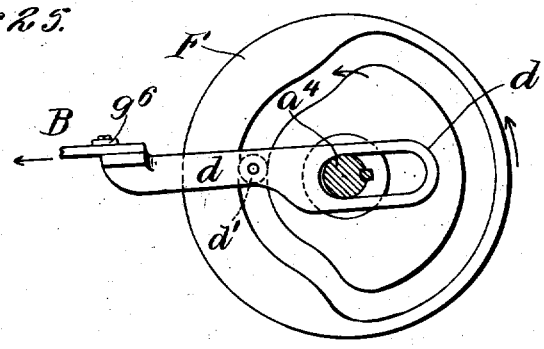
Figure 22:
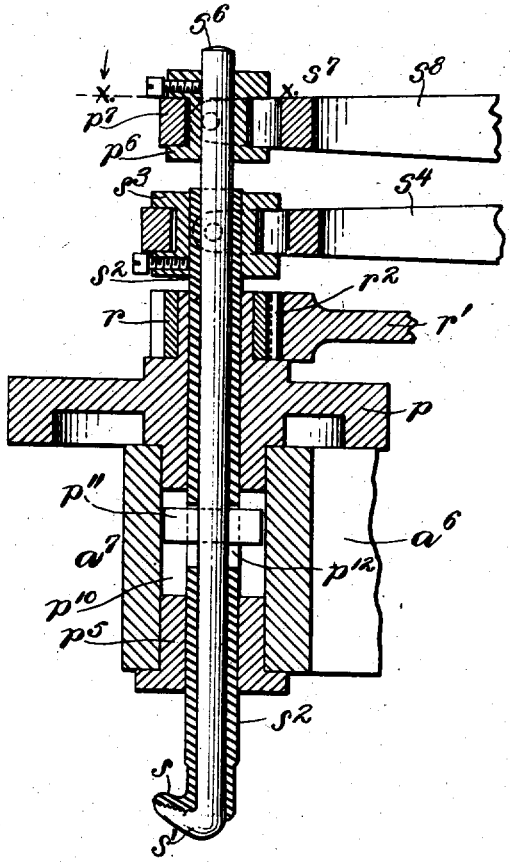
Figure 24:
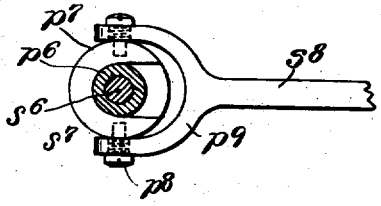
Figure 23:
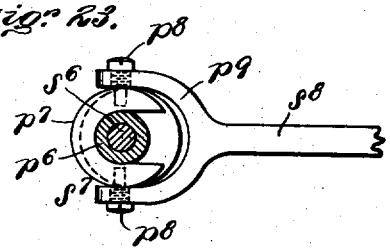

In the accompanying eight sheets of drawings, Figure 1 is a front elevation of my improved machine for lacing shoe-uppers, the parts being represented in the normal stationary position. Fig. 2 is a corresponding plan view. Fig. 3 is a corresponding front or left end view. Fig. 4 is a rear or right end view. Fig. 5 is a partial transverse sectional view, in reduced scale, taken on line $x$ $x$ of Fig. 2. Fig. 6 is a side elevation of the carrier, &c., in enlarged scale, a portion being broken away, the position of the parts or elements corresponding with Figs 1 and 2. Fig. 7 is a longitudinal sectional view of the carrier, &c., taken substantially on line 7 7 of Fig. 8, the looper needles and fingers being separated or in position to receive the cord-feeding needle between them. Fig. 8 is a corresponding plan view, a portion being broken away. Fig. 9 is a side elevation, in partial section, in enlarged scale, showing the cord holding and cutting devices, &c. Fig. 10 is a corresponding front view, parts being broken away. Fig. 11 is a plan view of the looper needles and fingers, showing their relation to the cord-feeding or main needle while the latter in its first advance is placing the cord in position. Fig. 12 is a similar view showing the feeding needle and fingers retracted to their limit and the looper needles advanced, the cord being in zigzag or looped engagement with said members and in position to receive the shoe-upper. Fig. 13 is a side elevation showing a portion of a shoe-upper in the folded position preparatory to being mounted on the looper-needles. Fig. 14 is a view similar to Fig. 12, but indicating the upper mounted on the needles, the feeding-needle having again advanced and inserted another portion of the cord through the looped ends supported in the looper-needles. Fig. 15 is a similar view showing the position of the looper needles and fingers after the upper (not shown) has been "stripped" therefrom, the feeding-needle being in its retracted or normal position. Fig. 16 is a plan view of the upper represented in Fig. 13, but showing in addition the lacing-cord looped through the eylets and corresponding with the upper when discharged from the needles. Fig. 17 represents side and plan views of the tying or knotting device, the position corresponding with that immediately following the liberation of the upper from the needles. Fig. 18 represents similar views showing a further stage or step in the tying process. Fig. 19 is a side view showing the jaws or bills elevated preparatory to releasing the ends of the cord from the holders, the cord meanwhile sliding downwardly on the bills. Fig. 20 represents side and plan views of the bills, &c., the ends of the cord having been freed from the holders and the knot practically completed, the work about to be released from the machine. Fig. 21 is a plan view showing the thus laced portion of the upper when opened or flattened out. Fig. 22 is an enlarged vertical central sectional view showing the construction of the knotting device, &c., and the manner of operating the same. Fig. 23 is a horizontal section taken on line $x$ $x$ of Fig. 22, showing the gimbal-joint. Fig. 24 is a similar view showing it in a changed position, and Fig. 25 is a side elevation showing a detail of the carrier-plate connection.

The following is a detailed description of my improved self-contained machine A for lacing shoe-uppers.

The several novel devices or elements constituting the invention are supported or mounted in the two side frames $a$ $a$ in turn secured to a base or sole plate $a'$. I would state that in Figs. 1 to 5, inclusive, the machine is represented as being substantially in the normal or stationary position. The machine is or may be operated by a continuously-revolving belt-driven pulley $a^2$, loosely mounted on the short stud or shaft $a^3$. A suitable friction-clutch, as $b$, is also mounted on said shaft, one portion being fast to a driving-gear $c$, the other secured to said pulley. The clutch may have a peripheral lug $b'$ arranged to be engaged by a movable spring-pressed dog $b^2$, capable of being swung into and out of action mechanically or by a treadle or other manually-controlled connection $b^3$, or both. Intergearing with said gear $c$ is another gear $c'$, (the latter as drawn being, say, double the diameter of the driving-gear,) secured to the main shaft $a^4$. To the last-named shaft may be secured a cam having a notch or depression $a^5$ therein adapted to receive an extension $b^5$ of said dog $b^2$. As thus constructed the arrangement constitutes an automatic stop-motion device—that is to say, while the member $b^5$ is in engagement with the concentric portion of the said cam the dog is kept disengaged from the lug $b'$ of the clutch, the latter being driven by the revolving pulley; but when the notch $a^5$ arrives opposite the dog the part $b^5$ thereof will swing therein, thereby placing the other part, $b^2$, in the path of the clutch, the forcible engagement of the lug $b'$ with the then stationary dog operating to arrest the clutch's movement and disconnect it from the pulley, thereby stopping the machine at each revolution of the main shaft. (See Fig. 3.) I make no claim to automatic stop mechanism, as any well-known device of this type may be successfully employed.

Between the side frames $a$ is located a laterally-guided member C, which I term a "carrier," adapted to be actuated in an intermittent manner by mechanism about to be described. This carrier has a number or series of looper-needles $e$ adjustably mounted therein. It also carries a plate B, capable of independent movement. Said plate has a number of looper-fingers $f$ adjustably mounted therein, alternating with the needles $e$. (See Figs. 6, 7, 8, &c.) The said carrier is jointed to a link $c^2$, in turn jointed to a bell-crank lever $c^3$, fulcrumed on a stationary shaft or rod $c^4$. The upper or free end of the other arm of said lever $c^3$ has a truck-roll $c^5$, in engagement with a suitable cam-shaped groove formed in the face of the cam-disk D, secured to the driving-shaft $a^4$. (See Fig. 5.) The function of this cam is to quickly elevate and depress the carrier. The latter has a pair of laterally-separated rearwardly-extending slotted arms $c^6$ $c^7$ slidably mounted on the shaft $a^4$. One of the arms, $c^7$, has a truck-roll $c^8$ mounted in a cam-shaped groove formed in the face of the cam-disk E, also secured to the driving-shaft. This cam is employed to reciprocate the carrier, thereby advancing and retracting the looper-needles. The said plate B. is slidably fitted to the carrier and secured to an arm $d$, the latter being slidably mounted or fulcrumed on the driving-shaft. Said arm is provided with a truck-roll $d'$, working in a cam-groove formed in the face of the cam-disk F, secured to the driving-shaft, the construction being such that the plate is capable of independent movement even while the carrier itself is in action. Fig. 25 shows the supporting-arm $d$ of said plate and also shows the cam-groove on the face of the disk F, in which the roller $d'$ of said arm acts.

The looper-needles $e$ are mounted to turn axially and simultaneously—say about ninety degrees—in holders $e'$, adjustably secured to the carrier. (See Figs. 7, &c.) Screws $e^2$ maintain the holders in position.

The front or free end of each needle has an open transverse groove $e^3$, adapted to receive the lacing-cord $v$. The shank of the needles is cut away or flattened at a point contiguous to the hook or groove, as indicated at $e^4$, the plane of the latter being at right angles to said groove. The rear end of each needle has a short crank $e^5$ in engagement with a longitudinal slot or groove $g'$, formed in the vertically-movable horizontal bar $g$. This bar is supported at each end by a bell-crank lever $g^2$, secured to a rocker-shaft $g^3$, as clearly shown. The other arm of each lever $g^2$ extends upwardly through a corresponding elongated opening $g^4$, formed in said plate B. Front and rear gage-bars $g^5$ $g^6$ are adjustably secured to the top of the plate by means of screws $g^7$. These bars are positioned with respect to the levers $g^2$ so as to engage and intermittingly vibrate the latter during the endwise movement of the plate B, thereby imparting movement to the bar $g$ to rock the needles $e$.

The looper-fingers $f$ are each held in a clamping device $f'$, adjustably secured in a slotted opening $f^2$, formed in the front portion of the plate B. The fingers are or may be made of wire and arranged to alternate with said needles. The front or outer end portion of each finger is bent downwardly and provided with a shoulder $f^3$. Figs. 6, 7, and 8 represent the extreme positions of the looper needles and fingers. The latter, however, have a greater movement than the needles.

The main or cord-feeding needle $h$ is secured in a movable holder $h^4$. Said needle is located at the front side of the machine and moves in an endwise direction in a horizontal plane. The needle has its eye in the pointed or front end, the shank being cut away at $h'$ at a point contiguous to and at the rear of the eye portion. A fixed downwardly-extending guide $h^1$, having an enlarged eye $h^3$ in alinement with the needle, is located at the right of the carrier, a corresponding or front guide $h^5$ being located at the left. (See Figs. 1, 11, &c.) These guide members receive the lacing-cord and hold it loosely in position to be acted upon by the intermediate looper fingers and needles, as herein later described.

The needle $h$ is operated as follows: To the upper part of the right-hand side frame is fastened an elongated casting $h^6$, forming ways in which the needle-holder $h^4$ reciprocates, motion being imparted thereto by means of a barrel-cam G, secured to the rear end of the driving-shaft $a^4$. A swinging lever $i$, having an end in engagement with said cam, is pivoted to the frame. The other end, $i'$, of the lever is a toothed segment meshing into a small gear $i^2$, secured to a short vertical revoluble shaft $i^3$, carrying a larger gear $i^4$, in engagement with a toothed rack $i^5$, secured to the back of the upper portion or head of the holder $h^4$. (See Figs. 2 and 4.) Thus it will be apparent that the lever $i$ traveling in the path of the properly-shaped revolving-cam groove imparts a corresponding movement to the needle $h$.

The machine is provided with a device adapted to frictionally hold the lacing-cord during certain parts of the needle's movement. This result is effected by, as drawn, means of a bent arm $k$, pivoted to the holder $h^4$. The upper end of said arm carries a loosely-turning roll $k'$, the opposite end or jaw portion being adapted when in use to temporarily hold the cord against the adjacent face of the holder, (see Figs. 1 and 4,) a spring $k^2$ or other analogous means serving to keep the jaw normally open, thus relaxing the tension upon the cord. At the top of the ways $h^6$ is located a pivotally-mounted lever $k^3$, having its front portion elongated and extending over the ways to form a cam or contact bar $k^4$, adapted when depressed to be interposed between the ways and roll $k'$, the arrangement being such that the needle-holder in its rearward movement causes the roll to ride upon the bar $k^4$, thereby at the same instant closing the jaw or lever $k$ frictionally against the adjacent surface of the holder and the cord. The lever $k^3$ (see Fig. 4) is jointed to another two-arm lever, $k^5$, pivoted to the side frame. The free end of the last-named lever extends in front of the cam G and is intermittingly actuated by means of a dog or pin $k^6$, fixed in the outer or rear end of said cam, or, in other words, the dog strikes the tappet or lever, thereby quickly depressing the cam-bar, a spring $k'$ returning the levers to the normal position and against a stop $k^7$, as shown.

At the front end of the machine are located the devices for holding, severing, and tying the lacing-cord. These means are more clearly illustrated, in enlarged scale, in Figs. 9, 10, 22, and 23 and also indicated in Figs. 1, 2, and 3. Said devices are mounted in an extension or bracket $a^6$ of the corresponding side-frame $a$. To the lower end of the bracket is secured a foot-plate $m$, having two small parallel grooves $m'$ $m^2$ formed in its upper face. These grooves are adapted to retain the cord therein during the lacing operation. A guided vertically-movable clamping-jaw $o'$ is mounted above the rear groove $m'$, the former when depressed serving to securely hold the front end of the cord in position in said groove. A similarly-mounted independently-movable clamping-jaw $o^2$, located in front of said member $o'$ and arranged with respect to the other or front groove, $m^2$, performs a like office for the rear end of the cord after the latter has been suitably introduced by the feeding-needle $h$. Suitably-attached springs $ó$ are employed to return the said members $o'$ $o^2$ to the upper or normally open position.

A thin flat knife or cutter $n'$ is secured to a vertically movable plunger $n$ and also mounted in the bracket $a^6$. Said plunger is located parallel with and in front of the said clamping members. A spring $o$, attached to the member $n$, maintains the latter in the normally elevated position. A removable cap-plate $a^7$ is secured to the front face of the bracket to hold the several movable parts in place. In the lower end portion of the front clamping-jaw $o^2$ is mounted a thin swinging finger $o^3$, its bottom end being bent or shaped so that when in use it will extend in front of the cord. Its upper end when in the normal position enters an opening $o^4$, formed in a thin stationary partition $o^5$, interposed between the adjacent faces of the two members $o'$ $o^2$, as clearly shown in Figs. 9 and 10. A light spring $o^6$ maintains the finger in yielding engagement with the partition.

The front edge of the foot-plate $m$ is provided with vertical notches or recesses $m^3$ $m^4$, the former, $m^3$, being adapted to freely receive the lower portion of said finger $o^3$, the other, $m^4$, serving a similar purpose for the knife $n'$.

The following describes the mechanism for actuating the cord clamping and severing devices: A horizontal disk or member $p$, having a vertically-arranged hollow shaft or hub $p^5$ on its under side, is revolubly mounted in the said bracket $a^6$ of the frame $a$, substantially as represented in enlarged scale in Fig. 22. The disk $p$ has three suitably shaped and positioned cams $p'$ $p^2$ $p^3$ on its under side adapted when the disk is revolved to successively engage and depress the said members $o'$, $o^2$ and $n$, respectively. (See Fig. 9.) The disk is rotated by means of a small spur-gear $r$, secured to or integral with the disk, which in turn receives motion from a suitable barrel-cam H, secured to the driving-shaft $a^4$ through the medium of a pivoted lever $r'$, one end of which engages the cam, the other end, $r^2$, being segment-shaped and provided with gear-teeth in engagement with said gear $r$. (See Figs. 2 and 3.)

The knotting or cord-tying device, to which, however, I make no broad claim, comprises two vertically movable and revoluble suitably-shaped coacting bills or jaws $s$ $s'$ located below the bracket $a^6$ and between the cord clamping and cutting devices and the forward stationary needle-guide $h^5$. The upper bill $s$ has a hollow shaft or shank $s^2$ extending upwardly therefrom through the center of the said cam-disk $p$ and gear $r$ (see Fig. 22) and is connected by a suitable or gimbal joint $s^3$ to a pivoted two-arm rocker-lever $s^4$, the rear arm $s^5$ of the latter being in engagement, say, with a suitably-shaped cam-groove I, formed in the front end of the cam member H. The lower bill $s'$ is secured to or integral with a shaft $s^6$, the same extending upwardly through and above the shaft or shank $s^2$, and is connected by a gimbal-joint $s^7$ to a pivoted two-arm lever $s^8$, its opposite or rear end being adapted to engage a suitable cam-groove K formed in the rear end of said cam member H. (See Fig. 2, &c.) The said joint or connection $s^7$ is more clearly represented in Figs. 22, 23, and 24, wherein a peripherally-grooved sleeve or thimble $p^6$ is adjustably secured to the shaft $s^6$ and having an open collar $p^7$, slidably fitted in said grooved part, the collar itself being in turn supported by oppositely-disposed pivot pins or screws $p^8$, mounted in the yoked end $p^9$ of said lever $s^8$. I may further add that the hub $p^5$ of the cam-disk has a vertical slot $p^{10}$ formed in its walls, through which extends a feather-key $p^{11}$, fast in the central shaft $s^6$, and at the same time extending through a slotted opening $p^{12}$, formed in the walls of the surrounding shaft $s^2$, as shown in Fig. 22.

By means of the arrangement just described the members $s$ $s'$ are capable of being moved up and down independently or in unison, as determined by the form of the actuating-cams. The jaw members also revolve concurrently with the gear $r$ and the cam-disk $p$—that is, the latter are given a reciprocating rotary motion as controlled by the shape of the continuous cam-groove formed in the periphery of the revolving cam H. The driving-shaft is adapted to revolve in one direction only, its movements, however, being intermittent by reason of interposed friction clutch mechanism substantially as hereinbefore described.

The manner of operation of my improved shoe-lacing machine A is as follows: Assuming first that the several devices and parts are in the normal stationary position, substantially as indicated in Figs. 1 to 6, &c., the operator or attendant first withdraws the dog $b^2$ from the lug $b'$ of the clutch, thus locking the clutch and gearing together and causing the main shaft to revolve in the arrow direction, Fig. 3. A short angular movement of the shaft brings the several cams D, E, and F into action, thereby elevating the carrier C from the position shown in Fig. 6 to that shown in Fig. 7, and at the same time advances the plate B and its looper fingers, instantly followed by the action of cam G, Fig. 2, which by means of the mechanism connected therewith quickly advances the cord-carrying needle $h$ through the eyes of the two fixed guides $h^2$ $h^5$ to its limit, the needle at the same time passing between the rear of the fingers $f$ and the front end of the looper-needles $e$. Meanwhile the rotation of cam H will (by means of lever $r'$, its gearing, &c.,) have rotated the cam-disk $p$ a short distance, thereby causing its cam $p'$ to engage and quickly depress the initial clamping-jaw $o'$ onto the free end of the lacing-cord $v$, then lying on the foot-plate $m$. Fig. 11 indicates the corresponding relation of the needles, &c. The cam G, &c., next quickly retracts the needle $h$ to its limit or original position. The cam E now operates to force the looper-needles ahead by advancing the carrier C, thereby causing the open grooves or notches $e^3$ to simultaneously engage with and receive therein the standing cord. At substantially the same instant the looper-fingers are retracted to their limit, the gage-bar $g^5$, secured to plate B, then engaging the ends of the two levers $g^2$, extending through the slots $g^4$, thereby vibrating the levers and lifting the bar $g$, the result being to simultaneously turn the needles $e$ axially ninety degrees, the flattened portions $e^4$ then being uppermost. When the fingers are retracted, as just stated, they also engage the cord and draw the latter rearwardly with them, thus producing a number or series of zigzag bends or loops 12, as indicated in Fig. 12. It will be noted that the axial movement of the needles $e$ transforms or twists the corresponding portions of the cord held therein from a horizontal plane to a vertical one, thus producing semiloops for the passage therethrough of the feeding-needle $h$. At this point the carrier is at its lowest position, ready to receive the upper on the cord-supporting needles $e$. At this instant, too, the machine automatically stops. The operator next takes a folded upper $u$, Fig. 13, and simultaneously presses the eyeleted portion $u'$ onto the shanks of the several needles, the cord still being retained in them. Now upon starting the machine the carrier and the work thereon are raised to the original position and the cord-feeding needle $h$ again advanced to its limit, its action being to pass endwise between the flattened portions $e^4$ of the looper-needles (the latter then being stationary) and the upper part of the semiloops formed by them and extending in front of the upper $u$, as indicated in Fig. 14. While the needle $h$ is in this advanced position the moving disk $p$ causes the cam $p^2$ thereof, Fig. 9, to engage the upper end of the second clamping-jaw $o^2$ and press it downwardly against the corresponding part of the cord then lying upon the foot-plate. Immediately preceding this, however, the lower or pointed end of the descending finger $o^3$ will enter the recess $h'$ of the then stationary needle $h$ and deflect the cord away from the needle and onto the plate $m$, the swinging movement of the finger being effected as its upper end passes from the opening $o^4$ and bears against the face of the partition $o^5$, the lower end meanwhile entering the notch $m^3$ of the foot-plate. Thus far the knotting-jaws have remained closed, but fully depressed, although revolving with the disk $p$. The needle $h$ is next retracted. During the initial part of this movement—say about one inch—the pin $k^6$ of the revolving cam G, Fig. 4, will engage lever $k^5$, thereby through the connected mechanism temporarily swinging the contact-bar $k^4$ downwardly into the path of the roll $k'$ of the tension-arm $k$, so that as the latter moves rearwardly in unison with the needle-holder the said roll will engage the front end of the bar $k^4$ and ride upon it, thus imparting additional tension to the cord—in fact, making it for the time being quite taut—such tension being maintained until the retreating needle-holder carries the roll from the rear end of the bar or track, at which instant the springs $k^7$ and $k^8$ automatically return the bar, &c., to the normal position again. While the cord is under tension, as just stated, the disk $p$ is further rotated, thereby causing the innermost cam $p^3$ thereof to engage a horizontal swinging dog $w$, having its free end $w'$ jointed to the upper end of the vertical knife-carrying plunger $n$, the result being to quickly depress the knife $n'$ against the cord and sever it, the knife passing into the notch $m^4$ of the foot-plate. The needle $h$ continues its rearward movement to the normal position and stops. The action of cam I, levers $s^4$ $s^5$, &c., now elevates and further rotates the tying or knotting jaws $s$ $s'$, the bills still being closed. At the same time the now threaded work or upper is automatically "stripped" or discharged from the looper needles and fingers, this latter operation being effected by retracting the needles and advancing the fingers. (See Fig. 15.) The work thus looped or threaded is still retained by the two ends of the cord, which extend through the front guide $h^5$ and being held by the clamping-jaws $o'$ $o^2$. Fig. 16 shows the looped upper, the mechanism being omitted. The further rotation of the tying-jaws carries them to the rear position, at which time the lower member $s'$ is depressed through the medium of cam K, lever $s^8$, &c., thereby opening the jaws. The latter while open are next further rotated and dropped to the normal position, the two strands or parts of the cord then being looped around the shank and extending between the open jaws. (See Fig. 17.) The latter are next closed by elevating the lower member, thereby clamping or pinching the cord between them. (See Fig. 18.) At about this instant the rotation of the disk $p$ and its cams releases the nippers or clamping-jaws $o'$ $o^2$, the respective springs $o$ returning them to the original or elevated position, and thus freeing the cord. The direction of rotation of the disk $p$ and the now closed bills is next reversed, the latter at the same time being again elevated, (see Fig. 19,) thereby causing the cord looped around the lower portion of the outer shank $s^2$ to slide downwardly therefrom and onto the heel of the jaws. The continued rotation of the cams, &c. depresses the jaws below the eye of the front guide $h^5$, thus insuring that the looped portion of the cord slips upwardly from the exterior of the closed jaws and around the portion of the cord held between them, thereby practically completing the knot. (See Fig. 20.) It may be added that the weight of the work itself materially assists in the operation of withdrawing the loop and contracting it to form a closed knot $v^2$. The final movement of the disk, &c., opens the jaws of the knotter and releases the ends of the cord, at which instant the now fully laced and tied upper falls from the machine, thus completing the operation. A further slight rotation of the driving-shaft returns the several devices to the original or normal position, (represented in Figs. 1, 2, 3, 4, 5, &c.,) the dog $b^5$ dropping into the cam-notch $a^{c_6}$ and at the same time placing the other member, $b^2$, in position to be engaged by the lug $b'$ of the clutch, thereby automatically stopping the machine. Fig. 21 represents the laced portion of the upper when opened or flattened out preparatory to submitting the upper to the lasting and bottoming operations.

While it has been deemed necessary to describe the several devices or suboperations in a relative order or sequence, it is to be understood that at certain times two or more of them may be working concurrently or substantially in unison. I may further state that the construction, arrangement, and positioning of the parts, as well as the timing of them with respect to one another, are such that the work is accomplished with grea facility and efficiency, the time consumed during each lacing operation being only a few seconds.

I do not desire to limit my invention to the exact construction of the instrumentalities or devices as illustrated in the drawings, as other or analogous means may be employed without departing from the spirit of the invention.

I claim as my invention and desire to secure by United States Letters Patent—

1. In a machine for lacing and tying together the eyeleted parts or quarters of shoe-uppers preparatory to lasting and bottoming them, a plurality of movably-mounted looper-needles and looper-fingers, means for feeding the lacing-cord and engaging the same by said needles and fingers to form a series of connected loops, mechanism for introducing a portion of the cord through said loops after the shoe-upper has been mounted on said cord-supporting needles, means for severing the cord from the source of supply, means for stripping the thus-laced upper from the needles, and mechanism for tying the ends of the cord together before the work is released from the machine.

2. In a machine of the character described, a series of movable looper-needles, a series of movable looper-fingers alternating with said needles, a reciprocating needle for feeding a lacing-cord in position with respect to said looper needles and fingers, means for severing the cord, and mechanism for tying together the ends of the severed piece of cord.

3. In a machine of the character described, a series of movable looper-needles, a corresponding series of movable looper-fingers alternating with said needles adapted to receive and support a lacing-cord, means for actuating said needles and fingers endwise in opposite directions to transform the cord into a series of connected zigzag loops, and means for inserting a portion of the cord through the said loops while the latter are supported by the needles and fingers.

4. In a machine of the character described, a movable carrier, a series of movable looper-needles mounted in the carrier capable of supporting the lacing-cord, a series of movable looper-fingers alternating with said needles, means for turning the said cord-supporting or looper-needles a partial revolution, whereby the looped portions of the cord are correspondingly turned or twisted thus placing the loops in alinement, and means for inserting another portion of the cord through the thus-formed loops.

5. In a machine of the character described, a series of movably-mounted looper-needles, a corresponding series of looper-fingers alternating with said needles, means for inserting a lacing-cord in position to be engaged by said looper-needles and looper-fingers, mechanism for actuating said needle and finger members endwise in opposite directions to engage the lacing-cord, thereby producing in it a series of connected zigzag bends or loops, and means for feeding the cord through said loops formed by the looper fingers and needles.

6. In a machine of the character described, the combination with movable looper-needles, movable looper-fingers and a longitudinally-reciprocating cord-carrying main needle $h$ arranged to place the cord in position to be engaged by said looper needles and fingers, of an initial gripping device for holding an end of the cord, a second gripping device for holding another portion of the cord after the latter has been passed through the looped cord mounted on said looper needles and fingers, means for severing the cord before it is released from said gripping devices, and means for tying the ends of the cord together.

7. In a machine of the character described, the combination of a gripping device, means for introducing the free end of a lacing-cord therein, a plurality of looper-needles and looper-fingers arranged with respect to one another, means for actuating said needles and fingers for engaging the cord and forming in it a series of connected loops, a second holding or gripping device, means for feeding another part of the cord through said loops into the last-named holding device, and means for severing the cord from the source of supply.

8. In a machine of the character described, the combination of a plurality of pairs of looper-needles and looper-fingers, means for feeding a lacing-cord and placing it in position with respect to said needles and fingers, means for actuating the needle and finger members to engage the cord and form in it a series of connected loops, means for feeding another portion of the cord through said loops after the eyeleted holes of a shoe upper have been pierced by said needles, means for severing the cord from the source of supply, means for tying together the ends of the cord and means for releasing the latter from the machine.

9. In a machine of the character described, provided with means for feeding the lacing-cord and means for forming therein a series of connected loops, the combination therewith of two independent gripping devices, each having a fixed jaw and a movable jaw member, for holding the cord in position between them while it is being converted into loops, means for actuating said movable jaw members, an automatically-actuated lever or member arranged to deflect the cord into the jaws of one of said gripping devices in advance of the latter's action, means for severing the cord from the source of supply, and means for tying together the ends of the cord.

10. In a machine of the character described, provided with a series of automatically-actuated looper-needles and looper-fingers constructed and arranged to produce in a lacing-cord a series of connected loops, the combination therewith of cord-gripping devices, a movable needle-carrying holder for feeding the lacing-cord to said gripping means, a normally open tension device for the cord movable with said holder, means for bringing the tension device into action at a predetermined point in the holder's movement, whereby the pressure of tension upon the cord is temporarily increased, means for severing the cord, and means for tying the ends of the latter together.

11. In a machine of the character described, the combination of a series of movable looper-needles and looper-fingers, a pair of laterally-separated fixed eyes or guides, $h^3$ $h^5$, having said looper members located between them, a reciprocating cord-feeding needle in alinement with and adapted to carry the cord through said guides, means for holding the ends of the cord, means for severing the cord, and means for releasing the cord from said holding means after it has been looped into the shoe-upper.

12. In a machine of the character described, provided with a series of movable looper-needles and looper-fingers, means for feeding a lacing cord to said needles and fingers, means for severing the cord, and automatically-actuated gripping-jaws for holding the ends of the cord in position while the said needle and finger members are converting it into a series of connected loops, in combination with a revoluble knot-tying device provided with a pair of vertically-movable cooperating jaws adapted to hold the two end portions of the cord and tie them together after the formation of said loops, and means for releasing the cord from the knot-tying device.

13. In a machine of the character described, means for forming in a cord a series of zigzag loops and for maintaining said loops in position to be passed through the eyelet holes of a shoe upper, means for passing a portion of said cord through said loops after the loops have been passed through the eyelet holes to form a locking cord, and means for securing the ends of said cord to prevent withdrawal.

14. In a machine of the character described, a series of looper needles arranged to pass a series of loops formed from a continuous cord through the eyelet holes of a shoe upper to partially form a lacing, means for passing a locking cord through said loops to complete the lacing, and means whereby the lacing is secured at the points required to leave in the lacing a sufficient amount of slack to permit the upper to be properly fitted to the last.

15. In a machine of the character described, a series of looper needles arranged to pass a series of loops formed from a continuous cord through the eyelet holes of a shoe upper to partially form a lacing, means for passing a locking cord through said loops to complete the lacing, means for providing slack in the lacing, and means for securing the lacing while sufficient slack remains therein to permit the laced portion of the upper to be properly fitted to the last.

16. In a machine of the character described, means for passing a cord in the form of a series of connected loops through the eyelet holes of a shoe upper, means for passing a portion of said cord through said loops to form a locking cord and means whereby said cord is secured at the points required to leave a sufficient amount of slack therein to permit the upper laced thereby to be properly fitted to the last.

17. In a machine of the character described, means for passing a cord in the form of a series of connected loops through the eyelet holes of a shoe upper, means for passing a portion of said cord through said loops to form a locking cord, means for providing slack in said cord, and means for securing said cord while sufficient slack remains therein to permit the upper laced thereby to be properly fitted to the last.

18. In a machine of the character described, means for engaging and locating a plurality of pairs of the eyelet holes of a shoe upper and for passing through the same a series of loops to partially form a lacing, means for passing a locking cord through said loops to complete the lacing, and means whereby the lacing is secured while sufficient slack remains therein to permit the upper laced thereby to be properly fitted to the last.

19. In a machine of the character described, means for passing a series of loops through the eyelet holes of a shoe upper to partially form a lacing and for maintaining said loops at a predetermined length to provide sufficient slack in the lacing to permit the upper to be properly fitted to the last, means for passing a locking cord through said loops to complete the lacing, and means for securing the lacing while preserving substantially the same amount of slack therein.

20. In a machine of the character described, means for passing a cord in the form of a series of connected loops through the eyelet holes of a shoe upper, means for passing a portion of said cord through said loops to form a locking cord, and means for securing the free ends of said cord outside of and across the edges of the upper.

21. In a machine of the character described, means for passing a cord in the form of a series of connected loops through the eyelet holes of a shoe upper, means for passing a portion of said cord outside of and across the edges of the upper and through said loops to form a locking cord, and means for securing the free ends of said cord.

22. In a machine of the character described, means for passing a cord in the form of a series of connected loops through the eyelet holes of a shoe upper, means for passing a portion of said cord outside of and across the edges of the upper and through said loops to form a locking cord, and means for securing the free ends of said cord outside of and across the edges of the upper.

23. In a machine of the character described, a plurality of looper needles constructed and arranged to simultaneously engage and locate a plurality of pairs of eyelet holes of a shoe upper, and to pass through the same a series of loops to partially form a lacing, means for passing a locking cord through said loops to complete the lacing, and means for securing the ends of the lacing to prevent withdrawal.

24. In a machine of the character described, having provision for engaging and locating a plurality of pairs of the eyelet holes of a shoe upper, means including a plurality of needles for forming a lacing comprising a series of connected loops passing through said eyelets means for locking said loops, and suitable actuating mechanism.

25. In a machine of the character described, means comprising a plurality of needles for engaging and locating a plurality of pairs of eyelets of a shoe upper and forming therein a series of connected loops, and means for completing the lacing and for securing the ends of the lacing to prevent withdrawal.

In testimony whereof I have affixed my signature in the presence of two witnesses.

WILLARD A. SMITH.

Witnesses:

WILLIAM QUINBY.

E. T. GRAHAM.